(12) United States Patent
Nair et al.

(10) Patent No.: US 10,238,973 B2
(45) Date of Patent: Mar. 26, 2019

(54) GENERATING DIGITAL ELEMENTS USING NON-DETERMINISTIC SELECTION

(71) Applicant: Electronic Arts Inc., Redwood City, CA (US)

(72) Inventors: Srikumar M. B. Nair, Palo Alto, CA (US); Igor Borovikov, Foster City, CA (US); Pawel Piotr Wrotek, San Mateo, CA (US)

(73) Assignee: Electronic Arts Inc., Redwood City, CA (US)

( * ) Notice: Subject to any disclaimer, the term of this patent is extended or adjusted under 35 U.S.C. 154(b) by 172 days.

(21) Appl. No.: 14/675,293

(22) Filed: Mar. 31, 2015

(65) Prior Publication Data

US 2016/0117865 A1   Apr. 28, 2016

Related U.S. Application Data

(60) Provisional application No. 62/068,395, filed on Oct. 24, 2014.

(51) Int. Cl.
*A63F 13/63* (2014.01)

(52) U.S. Cl.
CPC ...... *A63F 13/63* (2014.09); *A63F 2300/5553* (2013.01)

(58) Field of Classification Search
CPC .. G06T 17/00; G06F 17/2205; G06F 17/3011; G06F 17/30029; G06F 3/011; G06F 17/276; G06F 17/30011; G06F 17/30053; G06F 17/30265; G06F 17/30386; G06F 17/30528; G06F 17/3053; G06F 17/30554; G06F 17/30598; G06K 9/00281; G06Q 30/0641; H04L 67/2823; H04L 67/125; H04L 67/22; H04L 67/306; H04L 67/38; A63F 2300/5553; A63F 13/63; A63F 2300/65; A63F 13/79; A63F 13/12;
(Continued)

(56) References Cited

U.S. PATENT DOCUMENTS 6,446,083 B1 * 9/2002 Leight ............... G06F 17/30011
6,545,682 B1 * 4/2003 Ventrella ................. G06T 17/00
                                                                345/473
(Continued)

OTHER PUBLICATIONS

W3schools (NPL: XML, ASP, PHP, XSLT and Java definition , XML version 1.0, Oct. 1, 2014); MicrosoftXmlNodeSelectSingleNode(NPL: Microsoft, Jun. 19, 2013 ).*

*Primary Examiner* — Devona E Faulk
*Assistant Examiner* — Ming Wu
(74) *Attorney, Agent, or Firm* — Lowenstein Sandler LLP

(57) ABSTRACT

A list of attribute categories associated with a plurality of graphical assets to construct a simulated element of a graphical simulation is received. An element profile for the simulated element using the list of attribute categories is determined, wherein the element profile comprises an attribute value for each attribute category of the list of attribute categories. A list of graphical assets from the plurality of graphical assets that match the element profile is identified. A set of graphical assets from the identified list of graphical assets to be used to construct the simulated character is selected non-deterministically from the list, and the simulated element is subsequently constructed using the selected set of graphical assets.

11 Claims, 15 Drawing Sheets

(58) Field of Classification Search
CPC .............. A63F 13/52; A63F 2300/575; A63F 2300/6018; A63F 13/00; A63F 13/10; A63F 13/213; A63F 13/2145; A63F 13/40
See application file for complete search history.

(56) References Cited

U.S. PATENT DOCUMENTS

| | | | |
|---|---|---|---|
| 7,181,680 B2* | 2/2007 | Lin | G06F 17/2205 707/E17.123 |
| 9,645,978 B2* | 5/2017 | Frem | G06F 17/212 |
| 2004/0252341 A1* | 12/2004 | Adachi | G06F 3/1204 358/1.18 |
| 2009/0296110 A1* | 12/2009 | Mestha | H04N 1/00957 358/1.9 |
| 2011/0292051 A1* | 12/2011 | Nelson | G06K 9/00281 345/467 |
| 2013/0238981 A1* | 9/2013 | Nakamura | H04L 67/2823 715/234 |
| 2014/0092090 A1* | 4/2014 | Fleury | G06T 15/503 345/420 |
| 2015/0169193 A1* | 6/2015 | Assadian | G06F 3/04842 715/771 |
| 2016/0163083 A1* | 6/2016 | Barmpoutis | G06T 13/40 345/419 |

* cited by examiner

GENERATING DIGITAL ELEMENTS USING NON-DETERMINISTIC SELECTION

RELATED APPLICATIONS

This application is related to and claims the benefit of U.S. Provisional Patent application Ser. No. 62/068,395, filed Oct. 24, 2014, which is hereby incorporated by reference.

TECHNICAL FIELD

The present disclosure is generally related to graphical simulations, and more particularly, to generation of simulated characters in graphical simulations.

BACKGROUND

Simulation video games are a category of video games generally designed to simulate aspects of a real or fictional reality as closely as possible. A "life simulation" is a sub category of simulation video games in which a player can control one or more virtual life forms (e.g., a simulated human character, an animal, etc.). The SIMS 3™, published by Electronic Arts Inc. of Redwood City, Calif., is an example of a life simulation video game. In The SIMS 3™, a player can create a character for a life simulation and configure its appearance by changing its body type, physical attributes, clothing, or accessories. The player may select from a predefined list of physical attributes such as head size, shoulder width, waist size, etc., or facial features such as the location or size of the eyes, nose, ear, or lips.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1A:
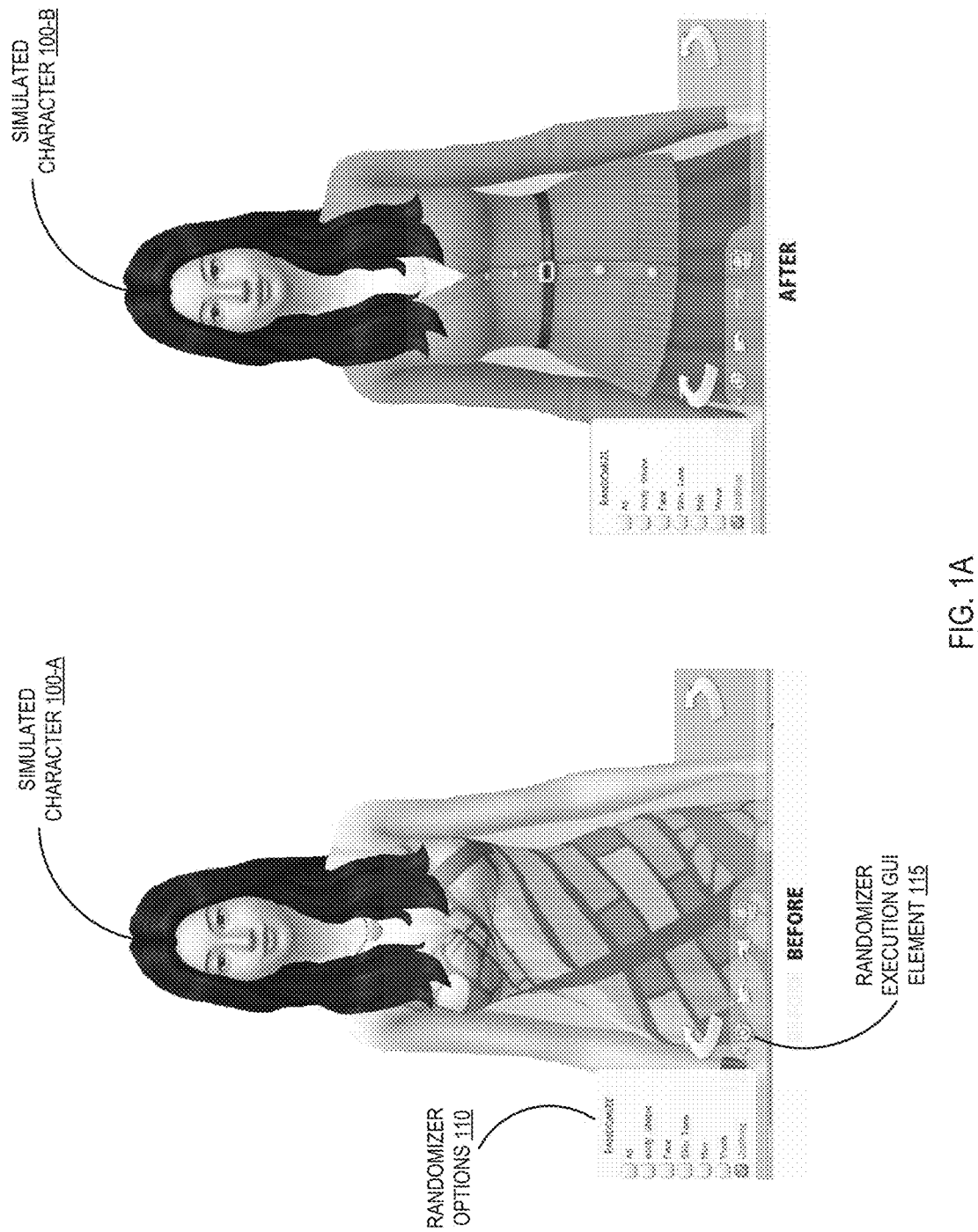
FIG. 1A illustrates an example of generating a simulated character using non-deterministic attribute selection, in accordance with one or more embodiments of the present disclosure.

Described herein are methods and systems for generating digital elements using non-deterministic selection. In some implementations, a player of a video game can create a character for a life simulation and configure its appearance by changing its body type, physical attributes, clothing, or accessories. Alternatively, the player may choose to have the simulation randomly generate a character for the player to use.

Typically, graphical simulations implement a random character generation feature by preconfiguring a set of template characters that may be used by a player. The simulation then can randomly choose from among the predefined set of characters. While this method simplifies the process of randomly selecting a character, it is limited by the number preconfigured set of characters available to the simulation. A player can obtain a randomly selected pre-generated character, but not a character with randomly configured component parts, properties, or physical features based on a palette of attributes that are complementary of each other. Alternatively, simulations may generate characters by randomly choosing from all available graphical assets available to the simulation without following any particular scheme or pattern. This often leads to the generation of characters with disjointed parts, resulting in non-cohesive looking characters.

Embodiments of the present disclosure provide the ability to generate simulated characters or objects by non-deterministically (e.g., randomly, pseudo-randomly, etc.) assembling them from cohesive parts that follow a predefined style or set of attributes. In an illustrative example, a non-deterministic selection system receives a list of attribute categories associated with graphical assets to construct a simulated character of a graphical simulation, such as a video game. The list of attribute categories may be received from a user via a user interface (e.g., a graphical user interface). Alternatively, the list of categories may be received from another component of a graphical simulation system (e.g., creating non-player characters during execution of the simulation). A graphical asset (or "component part") can include a 3D geometry associated with a graphic rendering of portion of a simulated character. For example, a 3D geometry of a shoe, a boot, a "garment bottom" (e.g., a pair of pants), a "garment top" (e.g., a shirt or blouse), a hat, hair, facial feature geometry, or any similar graphical object associated with a simulated character can be a graphical asset. Thus, a simulated character (or object, etc.) can be made up of more than one graphical asset. The graphical simulation may include a plurality of graphical assets that may be associated with a simulated character or other simulated element of the graphical simulation.

A graphical asset may be labeled ("tagged"), with attributes ("tags") that can classify the graphical asset in one or more categories of assets. For example, graphical asset types such as pants, tops, shoes, hair, skin tone, etc., can be labeled with attribute categories such as age, gender appropriateness, outfit type, style, color palette, racial archetype, or the like. An attribute can be made up of metadata associated with the graphical asset to describe the category to which the graphical asset may be assigned. In some implementations, attribute categories with their associated list of valid values can be maintained in a data store such as a database, configuration file, or any similar storage method. For example, the attribute category "age" may be associated with a list of age numbers, or in the alternative, may be associated with age classifications such as "infant," "child," "teen," "young adult," "adult," or "senior." In an illustrative example, attribute categories and their valid values are assigned unique identifiers, and the identifiers can be stored with the graphical asset. To determine the attributes associated with a particular graphical asset, the non-deterministic selection system can first identify the unique identifiers associated with the graphical asset and then access the data store to determine the applicable attribute values.

The non-deterministic selection system can determine a character profile for the simulated character using the list of attribute categories. The character profile can be made up of attribute values for each attribute category of the received list of attribute categories. The non-deterministic selection system can use the character profile to drive the selection of graphical assets and physical characteristics for the simulated character, generating a simulated character (or series of simulated characters) that follows a particular style or physical makeup. For example, the character profile can include the attribute categories Age, Gender, OutfitType, Style, and ColorPalette, with corresponding values of "Adult," "Female," "Athletic," "Punk," and "Summer." This profile can be used to identify all graphical assets and physical characteristics of the graphical simulation environment that have been tagged with the profile's attributes.

The character profile may be determined by non-deterministically selecting the attribute value for each attribute category of the received list of attribute categories. Each attribute value may be non-deterministically selected from a list of valid values for the attribute category. The non-deterministic value selection for each attribute category may be conducted randomly (e.g., using a random number generator), pseudo-randomly, or using other similar methods of non-deterministic selection of an item from a list of items. In some implementations, the non-deterministic selection system may select the attribute values for all of the attribute categories non-deterministically. Alternatively, the non-deterministic selection system may select the attribute values for at least one of the attribute categories non-deterministically, and select the attribute values for the remaining attribute categories based on predetermined values (e.g., preselected by the graphical simulation, selected by a user via a user interface, etc.).

For example, the non-deterministic selection system may be invoked during startup of a character generation component of a graphical simulation to generate a character based on character profile where the values for all of the attribute categories are non-deterministically generated. Thus, the non-deterministic selection system can create an initial character for a user that the user may keep, modify, or discard in favor of another character. The user may subsequently choose to non-deterministically generate a new character by modifying the attribute categories that may participate in the non-deterministic selection process. In some implementations, the user may modify the categories to be non-deterministically selected by interacting with elements of a user interface (e.g., a graphical user interface) such as selecting or deselecting checkboxes, using drop down lists, interacting with dialog windows, or in any similar manner. The user may then invoke the non-deterministic selection process by selecting another element of the user interface such as a button, menu item, or the like.

In an illustrative example, the non-deterministic selection system may be invoked to swap the gender of a simulated character but retain all other selected attributes of the character profile. The user may change the gender of the character using an element of the user interface (e.g., a checkbox, button, dropdown list etc.) and re-generate the character using the same physical attributes, clothing style, color palette, and racial archetype as the original character. The non-deterministic selection system can then modify the character profile with the new gender, subsequently creating the new character such that the new character may have a similar appearance as the original.

In another illustrative example, the non-deterministic selection system may be invoked during execution of the graphical simulation to create a non-player character (NPC) to interact with a player during the simulation. For example, if a player of a life simulation video game commands the simulated character to call for a delivery (e.g., a pizza delivery, package delivery, etc.), the graphical simulation can invoke the non-deterministic selection system to non-deterministically generate a delivery person character with some preset elements of the character profile. Each time a delivery person character is needed, the non-deterministic selection system can preset the attribute values for the OutfitType, Style, and ColorPalette attribute categories, and non-deterministically select the attribute values for the Age and Gender attribute categories. Thus, while each delivery person character can be wearing a similar style uniform with similar colors, the actual character may not look identical in physical appearance, age, or gender.

In another illustrative example, the non-deterministic selection system may be invoked to complete genetic attribute selection. For example, given two existing simulated parent characters, the non-deterministic selection system can create a simulated child by non-deterministically selecting some character profile attribute values from one of the parents and the remaining character attribute values from the other parent (e.g., racial archetype, facial features, skin tone, hair color, etc.). The character profile for the child may be determined by non-deterministically selecting the attribute value for each attribute category of the received list of attribute categories. Each attribute value may be non-deterministically selected from the values of either parent for that attribute category. In some implementations, the non-deterministic selection system may first non-deterministically select which attribute categories can be taken from Parent A, leaving the other categories to be taken from Parent B. Alternatively, the non-deterministic selection system can non-deterministically select the values for each attribute by going through the list of attribute categories and non-deterministically choosing the corresponding value from either parent.

Once the character profile has been determined, the non-deterministic selection system can identify a list of graphical assets from the plurality of graphical assets available to the graphical simulation that match the character profile. The non-deterministic selection system may first receive a list of graphical asset categories (graphical asset types) to select non-deterministically. Graphical asset categories can include a "garment top" (e.g., a shirt or blouse), a "garment bottom" (e.g., a pair of pants, shorts, a skirt, tights, etc.), footwear (e.g., shoe, boot, sandals, etc.), facial features, hair style, or the like. For each of the graphical asset categories on the received list, the non-deterministic selection system may identify the graphical assets available to the graphical simulation with associated attribute values for each attribute category that match the attribute values of each corresponding attribute category from the character profile. The non-deterministic selection system may then determine a list of eligible graphical assets for each graphical asset category using the identified matching graphical assets.

For example, using the example character profile above, the non-deterministic selection system may first identify all "garment top" graphical assets that have been tagged with the "Adult," "Female," "Athletic," "Punk," and "Summer" attributes, and create a list of eligible garment tops to choose from for the simulated character. The non-deterministic selection system may then identify all "garment bottom" graphical assets tagged with the same attributes, creating a list of eligible garment bottoms to choose from. The non-deterministic selection system my repeat the process until it has created lists of eligible graphical assets for each graphical asset category. Alternatively, the non-deterministic selection system may create a single list of all eligible assets in all graphical asset categories that match the character profile.

In some implementations, the non-deterministic selection system may utilize priority rules if there are no graphical assets available to the graphical simulation that match the character profile. For example, using the example profile above, if none of the graphical assets available to the graphical simulation have been tagged with "Adult," "Female," "Athletic," "Punk," and "Summer" attribute values. First, the non-deterministic selection may determine a priority order for the list of attribute categories. For example, the attribute categories may be Age, Gender, OutfitType, Style, and ColorPalette, where Age is the highest priority category and ColorPalette is the lowest priority category. Once it has been determined that none of the graphical assets available match the character profile, the non-deterministic selection system may determine a modified character profile by removing the attribute category from the character profile with the lowest priority in the priority order. In the current example, the non-deterministic selection system could remove the ColorPalette category from the character profile to create the modified character profile of Age ("Adult"), Gender ("Female"), OutfitType ("Athletic"), and Style ("Punk").

The non-deterministic selection system may then identify the graphical assets that have been tagged with attribute values for each attribute category that match the attribute values of each corresponding attribute category of the modified character profile. If no graphical assets available to the graphical simulation match the modified character profile, the non-deterministic selection system may repeat the prioritization process, removing the next lowest priority category from the priority list, and searching again. Once eligible graphical assets have been identified, the non-deterministic selection system can create a list of the eligible graphical assets for each graphical asset category using the identified graphical assets. Alternatively, the non-deterministic selection system may create a single list of all eligible assets in all graphical asset categories that match the character profile.

The non-deterministic selection system may subsequently select a set of graphical assets to be associated with the simulated character from the identified lists of eligible graphical assets. The set of graphical assets can include a single graphical asset for each of the graphical asset categories in the received list of graphical asset categories (e.g., a garment top, a garment bottom, an item of footwear, etc.). The non-deterministic selection can select one of the graphical assets from the list of eligible graphical assets for each of the graphical asset categories and create the set of graphical assets to be associated with the simulated character. In some implementations, each graphical asset in the resulting set of graphical assets may be selected non-deterministically from the associated list of eligible graphical assets. For example, the selected garment top asset may be non-deterministically selected from the list of all eligible garment tops that match the character profile. Similarly, the selected garment bottom may be non-deterministically selected from the list of all eligible garment bottoms that match the character profile. This process can be repeated for each of the graphical asset categories as noted above. Once the set of graphical assets has been determined, the selected set of graphical assets may be assigned to the simulated character.

Embodiments of the present disclosure provide the ability to generate simulated characters or objects by non-deterministically (e.g., randomly, pseudo-randomly, etc.) assembling them from cohesive parts that follow a predefined style or set of attributes. This can provide an enhanced user experience by improving the intelligence of non-deterministic character or object creation. Additionally, this can reduce the memory and storage required to support a simulation application since the pre created character templates may no longer be required. Further, since the non-deterministic selection is data driven using the asset tags, categories and asset relationships can be added to a simulation at the data structure level without the need to make other software reconfiguration changes to provide the user with the appropriate functionality.

Figure 1B:
FIG. 1B illustrates an example of a series of non-deterministically generated female characters using a single character profile, in accordance with one or more embodiments of the present disclosure.
Figure 1C:
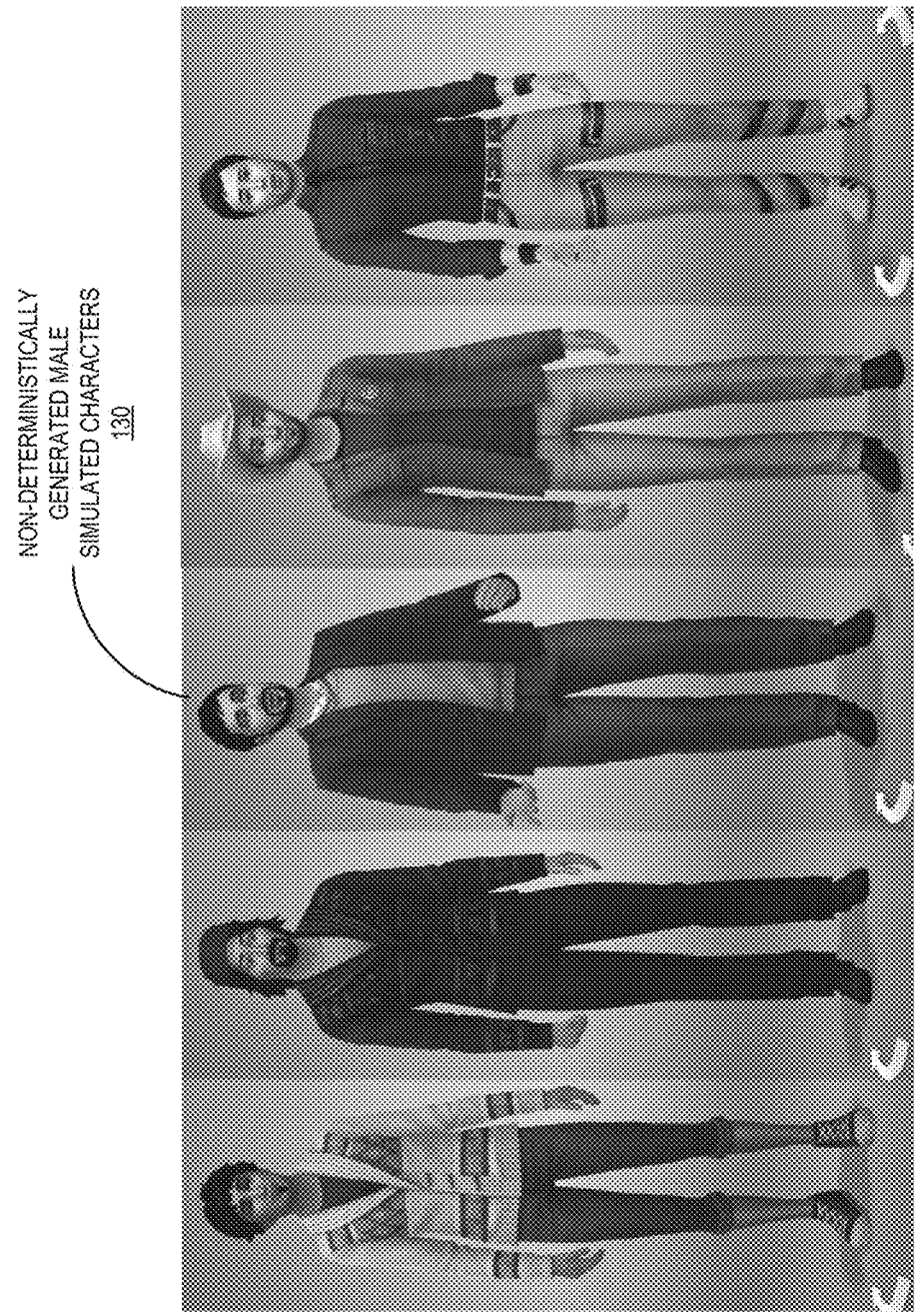
FIG. 1C illustrates an example of a series of non-deterministically generated male characters using a single character profile, in accordance with one or more embodiments of the present disclosure.

FIGS. 1A-1C illustrate examples of generating simulated characters using non-deterministic attribute selection. FIG. 1A illustrates an example of before and after images of a simulated character using non-deterministic attribute selection using a graphical user interface. Simulated character 100 is shown before (simulated character 100-A) and after (simulated character 100-B) non-deterministic attribute selection has been executed. A user may select from a randomizer options 110 to drive the attribute selection process. As shown in FIG. 1A, the "clothing" option has been selected, which can result in executing a non-deterministic selection of clothing graphical assets for the character 100-A. A user may execute the non-deterministic attribute selection by selecting randomizer execution GUI element 115, which can be a button, link, menu option, or any similar element of a user interface. Once selected, graphical assets available to the graphical simulation that are classified as "clothing" and that have attributes that match the other elements of the character profile for simulated character 100-A may be selected non-deterministically (randomly, pseudo-randomly, etc.) as described above and below with respect to FIGS. 4-9. As shown in FIG. 1A, the result of the non-deterministic attribute selection can result in simulated character 100-B, which presents a character with unchanged physical attributes but with different clothing graphical assets (a sweater and skirt in the "after" image as opposed to the dress in the "before" image).

FIGS. 1B and 1C illustrate examples series of non-deterministically generated simulated characters using a single character profile. FIG. 1B illustrates an example of a series of non-deterministically generated female characters using a single character profile. Non-deterministically generated female simulated characters 120 present successively generated female characters, each of which been assigned clothing assets that follow a similar design and color palette. Non-deterministically generated female simulated characters 120 can represent the resulting characters generated by repeated selection of the randomizer execution GUI element 115 of FIG. 1A after having selected additional options from randomizer options 110 of FIG. 1A. FIG. 1C illustrates an example of a series of non-deterministically generated male characters using a single character profile. Non-deterministically generated male simulated characters 130 present successively generated male characters, each of which have been assigned clothing assets that follow a similar design and color palette. Non-deterministically generated male simulated characters 130 can represent the resulting characters generated by repeated selection of the randomizer execution GUI element 115 of FIG. 1A after having selected additional options from randomizer options 110 of FIG. 1A.

Figure 2A:
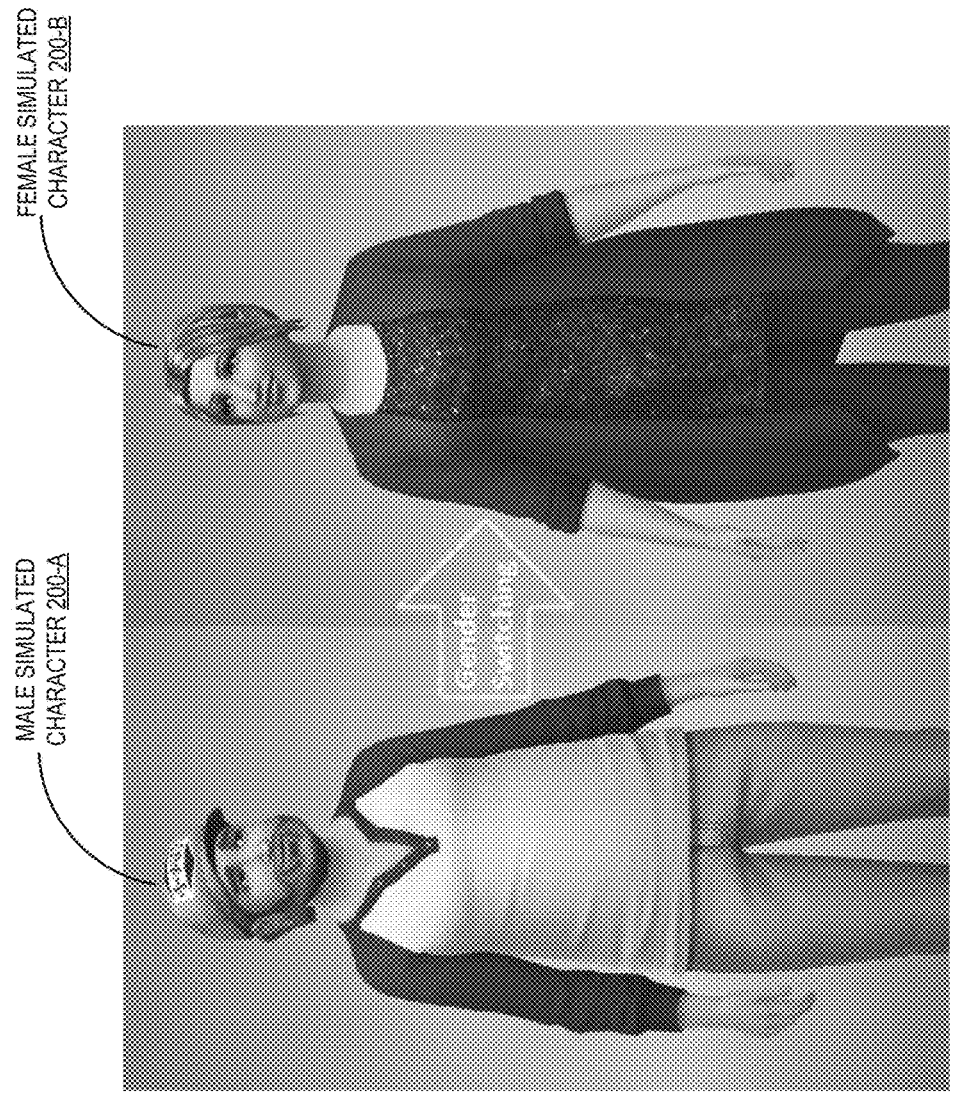
FIG. 2A illustrates an example of gender switching of a simulated character using a single character profile, in accordance with one or more embodiments of the present disclosure.

FIG. 2A illustrates an example of gender switching of a simulated character using a single character profile. A user that starts with male simulated character 200-A may invoke non-deterministic attribute selection to switch to female simulated character 200-B by selecting an option in a user interface (such as randomizer options 110 of FIG. 1A, or other similar interface element). The attributes associated with the graphical assets and physical characteristics of male simulated character 200-A can be used to select graphical assets and physical characteristics for female character 200-B such that the two characters appear to be genetically similar and wear clothing in a similar style.

Figure 2B:
FIG. 2B illustrates examples of non-player simulated characters generated using a single character profile, in accordance with one or more embodiments of the present disclosure.

FIG. 2B illustrates examples of non-player simulated characters generated using a single character profile. Simulated characters 210-A, 210-B, and 210-C each represent possible versions of non-player simulated characters (NPCs) that could be generated during game execution to interact with players of a graphical simulation. As shown in FIG. 2B, each of simulated characters 210-A, 210-B, and 210-C present examples of delivery person character that could be generated at different times and by actions of different players of the graphical simulation so that no two players encounter exactly the same delivery person character. Each of simulated characters 210-A, 210-B, and 210-C has been generated from a similar character profile, but have different genders, different physical characteristics, but have similar uniforms.

Figure 2C:
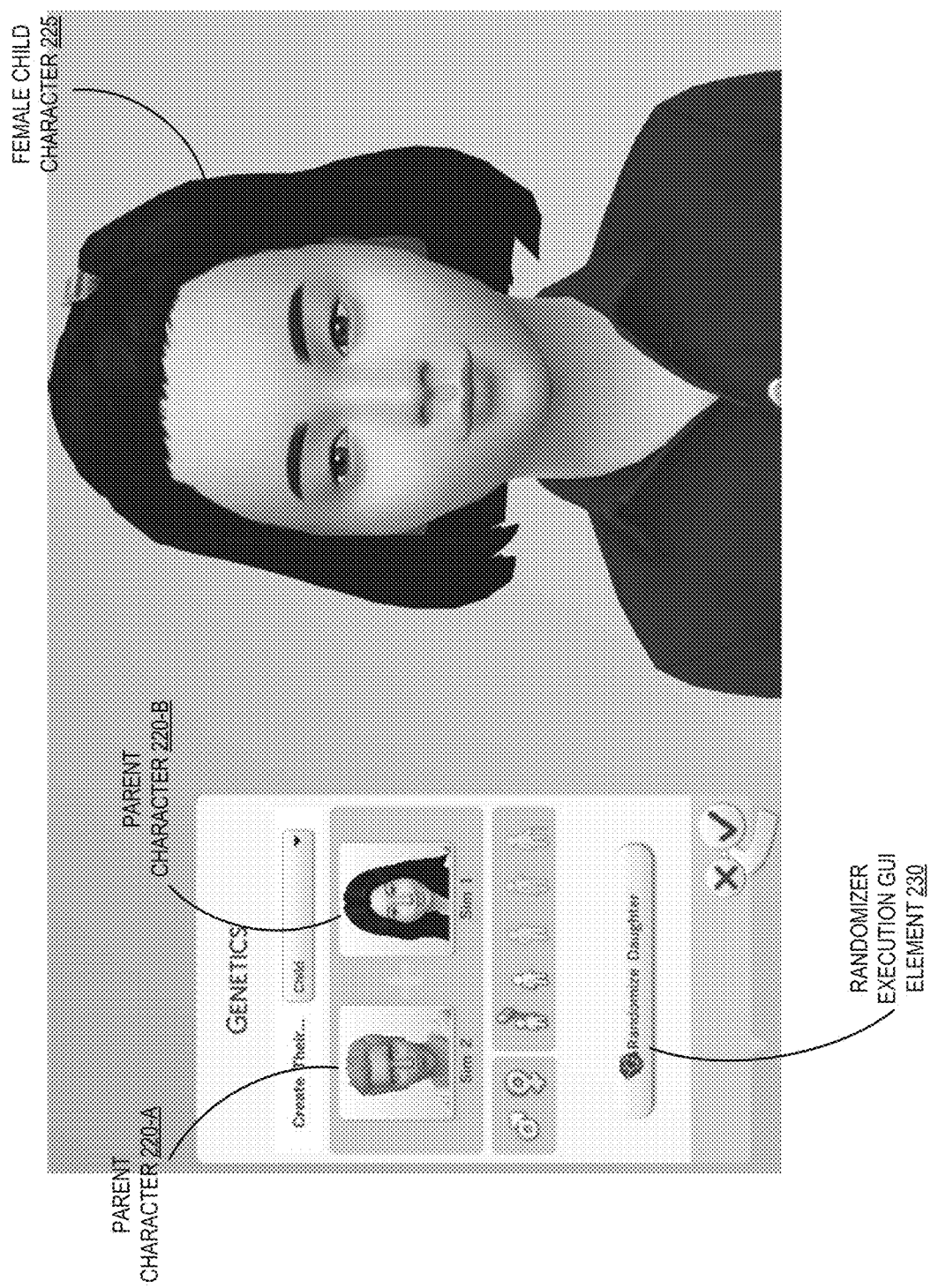
FIG. 2C illustrates an example of genetic attribute selection, in accordance with one or more embodiments of the present disclosure.
Figure 2D:
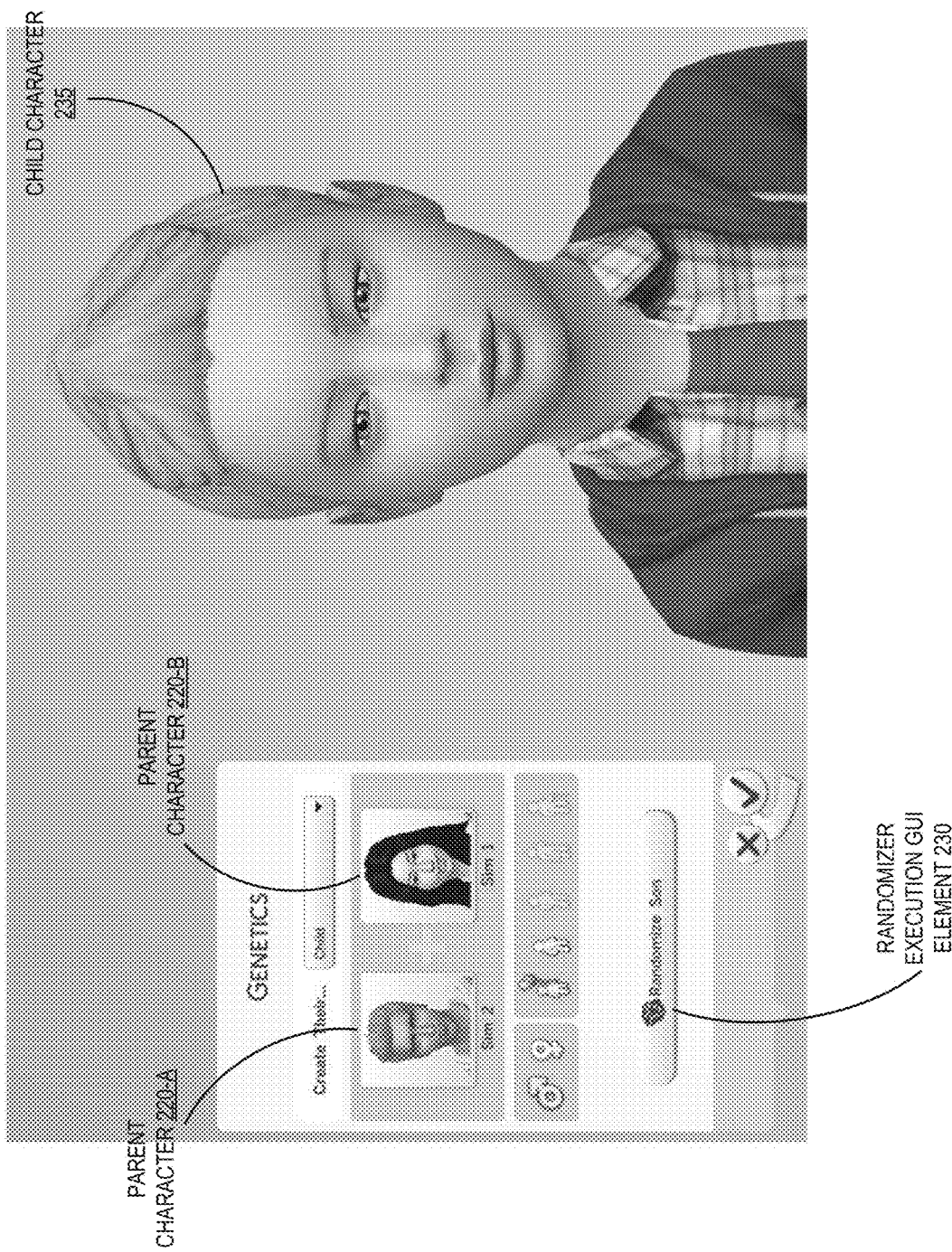
FIG. 2D illustrates an example of genetic attribute selection, in accordance with one or more embodiments of the present disclosure.

FIGS. 2C-2D illustrate examples of genetic attribute selection. In FIG. 2C, female child character 225 is generated using the predefined character profiles of parent character 220-A and parent character 220-B. A user may generate female child character 225 by selecting randomizer execution GUI element 230 on a graphical user interface, which can non-deterministically (randomly, pseudo-randomly, etc.) select physical attributes from the character profiles of either of parent character 220-A and parent character 220-B. As shown in FIG. 2C, female child 225 has been generated using the hair color and eye shape from parent character 220-B, but the nose shape and mouth shape from parent character 220-A. In FIG. 2D, male child character 235 is generated using the predefined character profiles of parent character 220-A and parent character 220-B. A user may generate male child character 235 by selecting randomizer execution GUI element 230 on a graphical user interface, which can non-deterministically (randomly, pseudo-randomly, etc.) select physical attributes from the character profiles of either of parent character 220-A and parent character 220-B. As shown in FIG. 2D, male child 235 has been generated using the eye shape and mouth shape from parent character 220-B, but the hair color and nose shape from parent character 220-A.

It should be noted that while FIGS. 1A-2D illustrate particular simulated characters, one of ordinary skill in the art would appreciate that the described embodiments of the present disclosure are not limited only to these particular characters, and thus may be applied to different types of simulated characters (both human and non-human), or other simulated elements that may be present in a graphical simulation such as machines (e.g., cars), structures (e.g., buildings), or objects (e.g., shapes). Additionally, while embodiments of the present disclosure have been described with respect to a simulated character of a video game, one of ordinary skill in the art would appreciate that the described embodiments of the present disclosure are not limited to video games, and thus may be applied to any computer program that can display simulated characters, machines, or objects. Illustrative examples can include immersive simulations (virtual reality simulations), architectural design simulations, fashion design simulations, automotive customization simulations, and the like.

Figure 3:
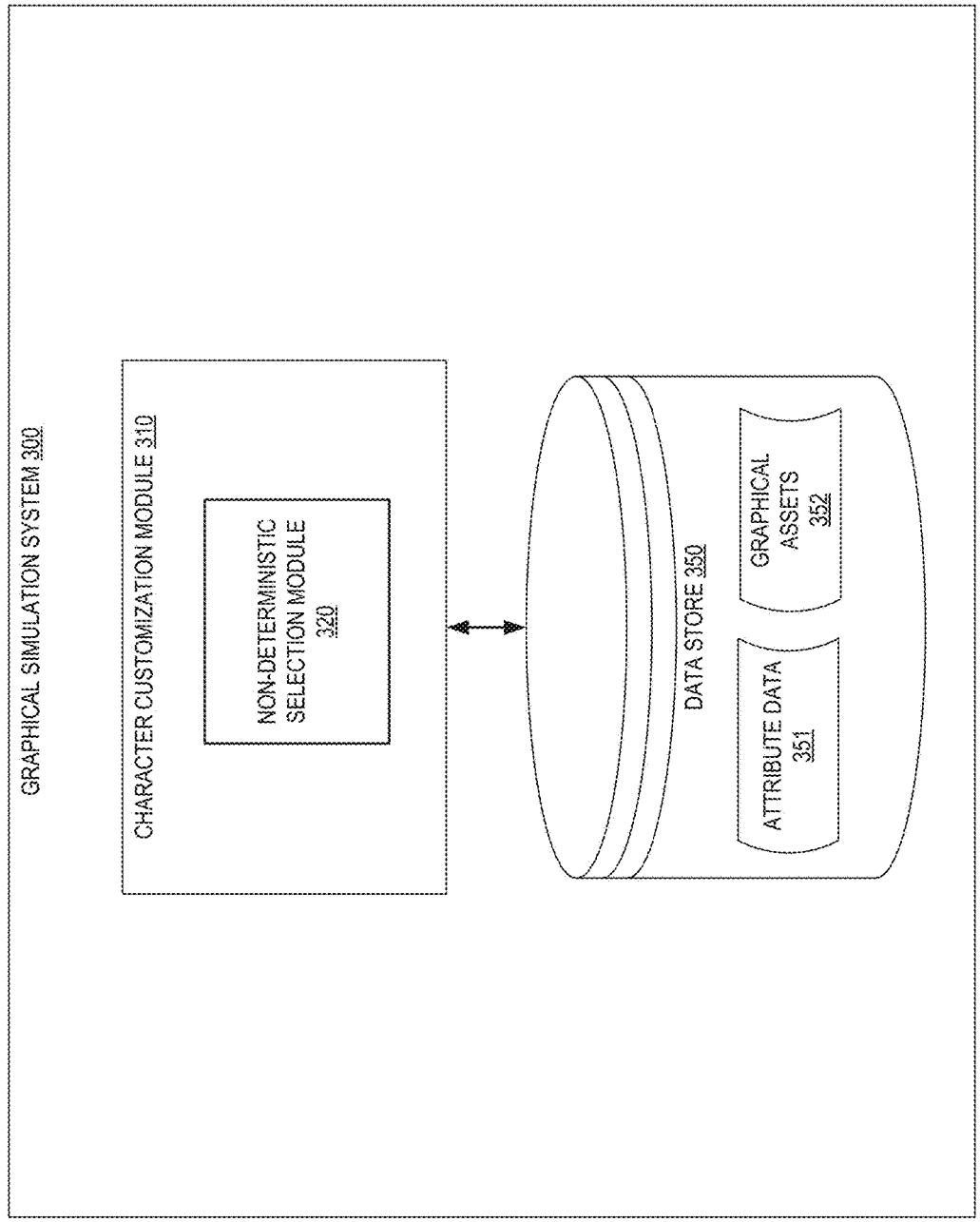
FIG. 3 depicts a high-level component diagram of an example graphical simulation system architecture, in accordance with one or more embodiments of the present disclosure.

FIG. 3 depicts a high-level component diagram of an illustrative example of a graphical simulation system 300, in accordance with one or more embodiments of the present disclosure. One skilled in the art will appreciate that other architectures for graphical simulation system 300 are possible, and that the implementation of a computer system utilizing examples of the invention are not necessarily limited to the specific architecture depicted by FIG. 3.

As shown in FIG. 3, the graphical simulation system 300 may include a character customization module 310 and a data store 350 (e.g., one or more magnetic hard disk drives, a Universal Serial Bus [USB] solid state drive, a Redundant Array of Independent Disks [RAID] system, a network attached storage [NAS] array, etc.). The graphical simulation system 600 may be a server, a mainframe, a workstation, a personal computer (PC), a mobile phone, a palm-sized computing device, etc. Graphical simulation system can generate and maintain simulated characters for use in a video game. For example, graphical simulation system can be accessed by a user via a graphical user interface to create a simulated character for use in a video game. Alternatively, graphical simulation system may be used as a runtime component of a video game, providing real time modifications to simulated characters during execution of the video game (meaning, graphical conflicts between assets associated with a simulated character may be resolved as they occur during the execution of the simulation video game).

Character customization module 310 can manage customization of physical features associated with a simulated character. In certain implementations, character customization module 310 may be invoked by a graphical user interface to select physical attributes of a simulated character. For example, a user interface may permit a user to modify age, body type, hair color, etc.

Character customization module may additionally include non-deterministic selection module 320 that can allow the user to non-deterministically generate a simulated character from a list of cohesive graphical assets that follow certain attributes, as described in detail below with respect to FIGS. 4-9. It should be noted that in some alternative implementations, non-deterministic selection module 320 may be external to character customization module 310, rather than embedded within character customization module 310, or may replace character customization module 310.

Data store 350 can store information related to portions of a simulated character that may be modified in a video game. Data store 350 may include attribute data 351, which can store the complete list of attribute categories and associated valid values available for a simulated character in graphical simulation system 300. Data store 350 may additionally include graphical assets 352, which can store the geometry data for each graphical asset available in graphical simulation system 300 (e.g., the shape, color, and appearance of each asset, etc.) as well as any associated tag identifiers. Information from data store 350 can be accessed by non-deterministic selection module 320 to non-deterministically generate a simulated character, as described in detail below with respect to FIGS. 4-9.

Figure 4:
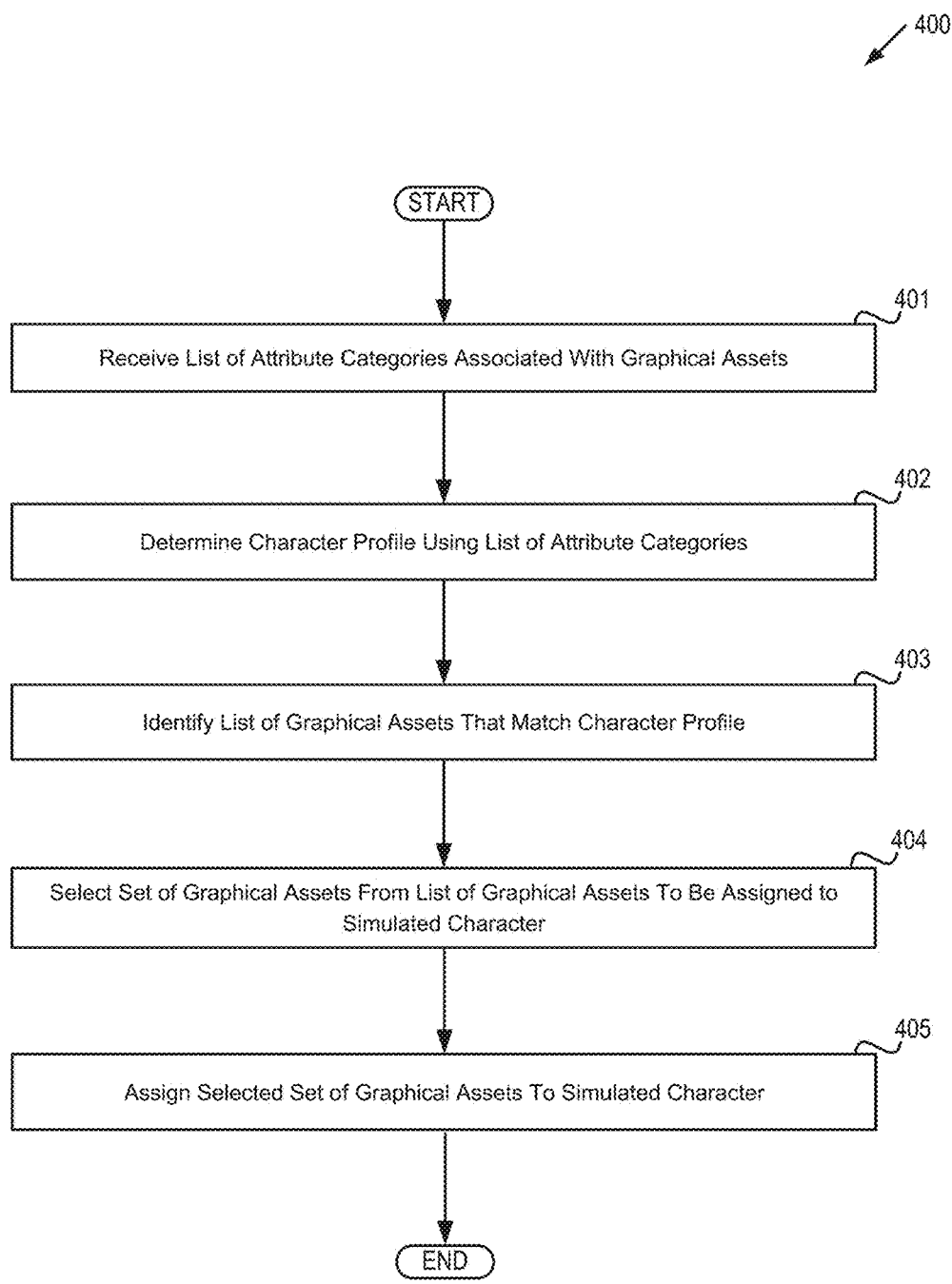
FIG. 4 depicts a flow diagram of a method for non-deterministic selection of attributes for a simulated character, in accordance with one or more embodiments of the present disclosure.

FIG. 4 depicts a flow diagram of an example method 400 for non-deterministic selection of a simulated character. The method may be performed by processing logic that may comprise hardware (circuitry, dedicated logic, etc.), software (such as is run on a general purpose computer system or a dedicated machine), or a combination of both. In one illustrative example, method 400 may be performed by non-deterministic selection module 320 in FIG. 3. Alternatively, some or all of method 400 might be performed by another module or machine. It should be noted that blocks depicted in FIG. 4 could be performed simultaneously (at least partially overlapping in time) or in a different order than that depicted.

At block 401, processing logic receives a list of attribute categories associated with graphical assets to construct a simulated character of a graphical simulation. The list of attribute categories may be received from a user via a user interface (e.g., a graphical user interface). Alternatively, the list of categories may be received from another component of a graphical simulation system (e.g., creating non player simulated characters during execution of the simulation). An attribute can be made up of metadata associated with the graphical asset to describe the category to which the graphical asset may be assigned.

At block 402, processing logic determines a character profile using the list of attribute categories from block 401. The character profile can be made up of attribute values for each attribute category of the received list of attribute categories. Processing logic can use the character profile to drive the selection of graphical assets and physical characteristics for the simulated character, generating a simulated character (or series of simulated characters) that follows a particular style or physical makeup. The character profile may be determined by non-deterministically selecting the attribute value for each attribute category of the received list of attribute categories. Each attribute value may be non-deterministically selected from a list of valid values for the attribute category. Alternatively, the non-deterministic selection system may select the attribute values for at least one of the attribute categories non-deterministically, and select the attribute values for the remaining attribute categories based on predetermined values (e.g., preselected by the graphical simulation, selected by a user via a user interface, etc.). In illustrative examples, processing logic may determine the character profile as described in further detail below with respect to FIGS. 5-6.

At block 403, processing logic identifies a list of graphical assets that match the character profile from block 402. In illustrative examples, processing logic may identify the list of graphical assets as described in further detail below with respect to FIGS. 7-8. At block 404, processing logic selects a set of graphical assets to be used to construct to a simulated character from the list of graphical assets identified at block 403. In an illustrative example, processing logic may select the set of graphical assets as described in further detail below with respect to FIG. 9. At block 405, processing logic constructs the simulated character using the set of graphical assets from block 404. After block 405, the method of FIG. 4 terminates.

Figure 5:
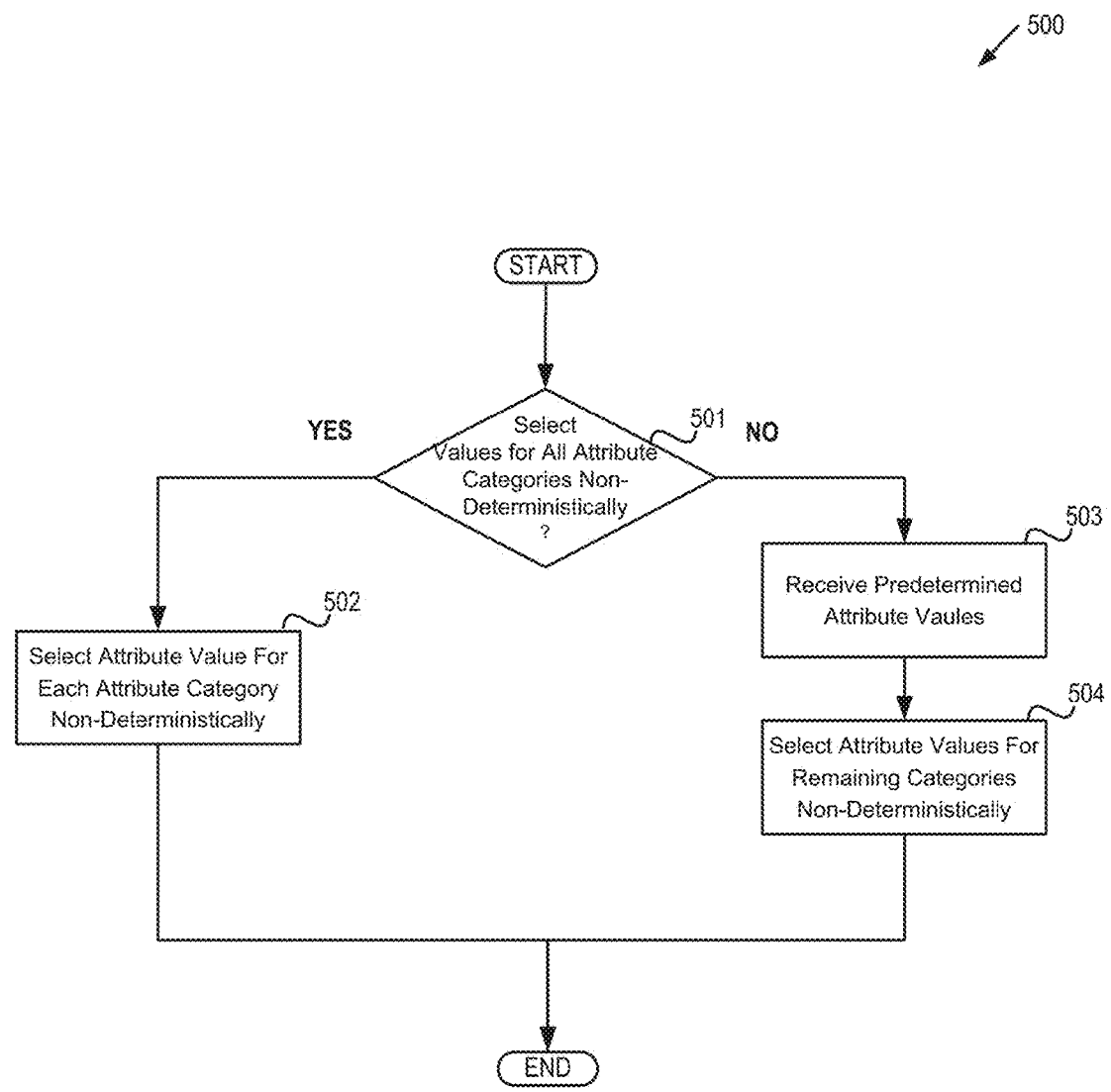
FIG. 5 depicts a flow diagram of a method for determining a character profile for a simulated character, in accordance with one or more embodiments of the present disclosure.

FIG. 5 depicts a flow diagram of an example method 500 for determining a character profile for a simulated character. The method may be performed by processing logic that may comprise hardware (circuitry, dedicated logic, etc.), software (such as is run on a general purpose computer system or a dedicated machine), or a combination of both. In one illustrative example, method 500 may be performed by non-deterministic selection module 320 in FIG. 3. Alternatively, some or all of method 500 might be performed by another module or machine. It should be noted that blocks depicted in FIG. 7 could be performed simultaneously (at least partially overlapping in time) or in a different order than that depicted.

At block 501, processing logic branches based on whether or not values for all attribute categories will be selected non-deterministically. If so, processing continues to block 502. Otherwise processing proceeds to block 503. At block 502, processing logic non-deterministically selects the attribute value from a list of valid values for each attribute category of the list of received attribute categories. The non-deterministic value selection for each attribute category may be conducted randomly (e.g., using a random number generator), pseudo-randomly, or using other similar methods of non-deterministic selection of an item from a list of items. After block 502, the method of FIG. 5 terminates. If processing proceeds to block 503, processing logic receives the predetermine attribute values for at least one of the attribute categories. At block 504, processing logic non-deterministically selects the attribute value from the list of valid values for each of the remaining attribute categories. After block 503, the method of FIG. 5 terminates.

Figure 6:
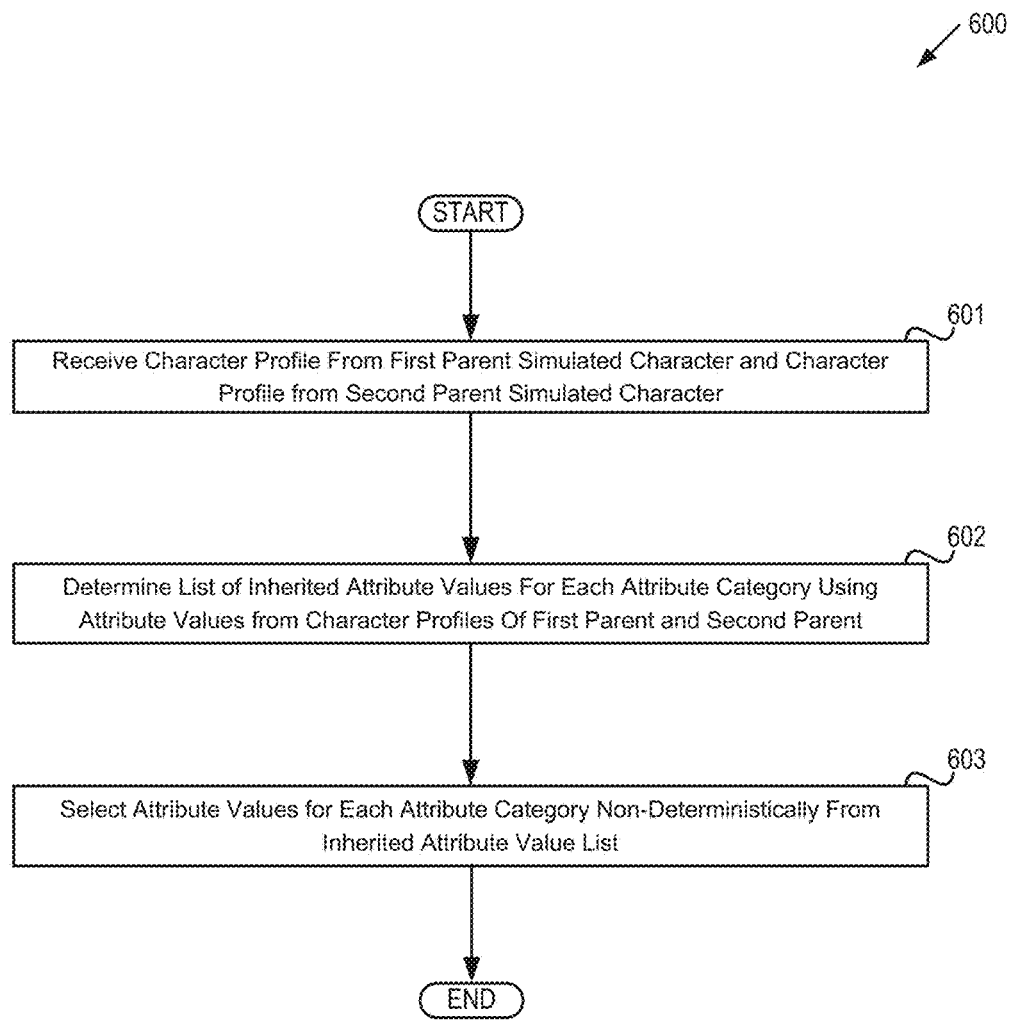
FIG. 6 depicts a flow diagram of a method for genetic attribute selection for a simulated character, in accordance with one or more embodiments of the present disclosure.

FIG. 6 depicts a flow diagram of an example method 600 for genetic attribute selection for a simulated character. The method may be performed by processing logic that may comprise hardware (circuitry, dedicated logic, etc.), software (such as is run on a general purpose computer system or a dedicated machine), or a combination of both. In one illustrative example, method 600 may be performed by non-deterministic selection module 320 in FIG. 3. Alternatively, some or all of method 600 might be performed by another module or machine. It should be noted that blocks depicted in FIG. 6 could be performed simultaneously (at least partially overlapping in time) or in a different order than that depicted.

At block 601, processing logic receives a character profile from a first parent simulated character and a character profile from a second parent simulated character. At block 602, processing logic determines a list of inherited attribute values for each attribute category using attribute values from the character profiles of the first and second parent simulated characters received at block 601. At block 603, processing logic selects attribute values for each attribute category non-deterministically from the inherited attribute value list created at block 602.

After block 603, the method of FIG. 6 terminates.

Figure 7:
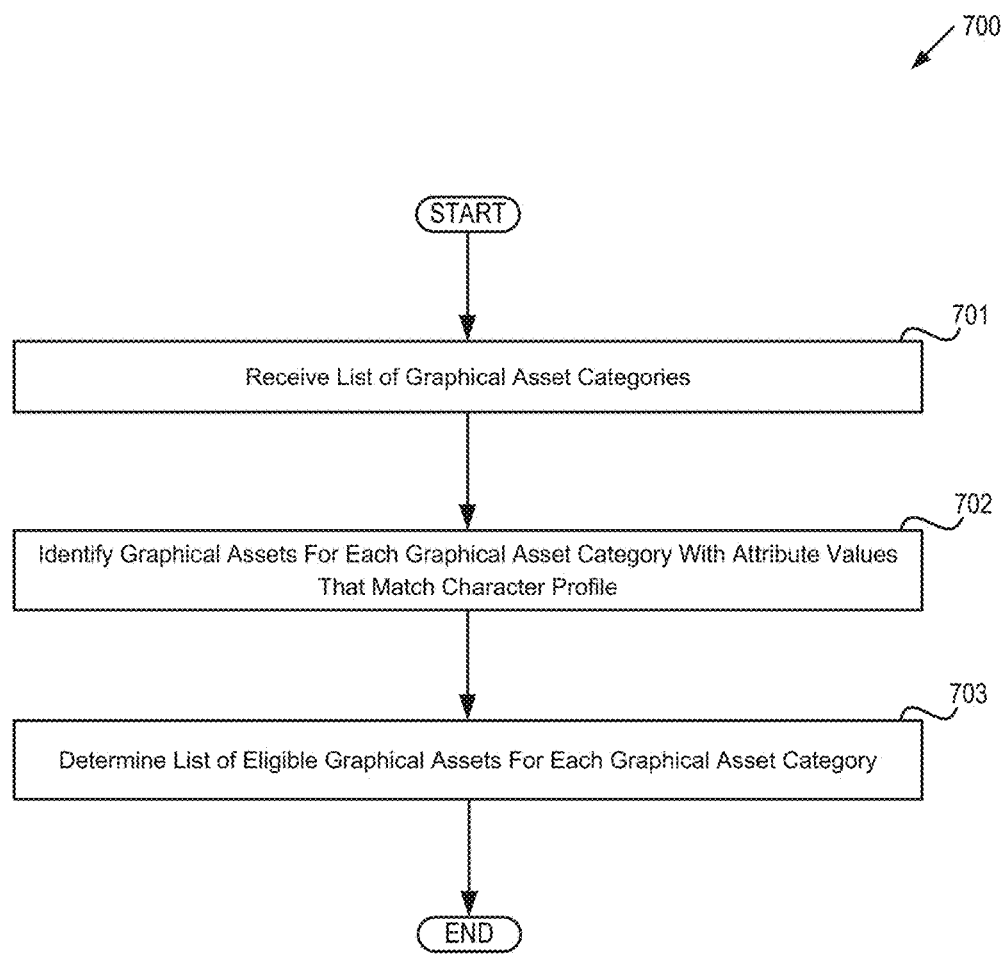
FIG. 7 depicts a flow diagram of a method for identifying a list of graphical assets that match a character profile, in accordance with one or more embodiments of the present disclosure.

FIG. 7 depicts a flow diagram of an example method 700 for identifying a list of graphical assets that match a character profile. The method may be performed by processing logic that may comprise hardware (circuitry, dedicated logic, etc.), software (such as is run on a general purpose computer system or a dedicated machine), or a combination of both. In one illustrative example, method 700 may be performed by non-deterministic selection module 320 in FIG. 3. Alternatively, some or all of method 700 might be performed by another module or machine. It should be noted that blocks depicted in FIG. 7 could be performed simultaneously (at least partially overlapping in time) or in a different order than that depicted.

At block 701, processing logic receives a list of graphical asset categories to select non-deterministically. Graphical asset categories can include a "garment top" (e.g., a shirt or blouse), a "garment bottom" (e.g., a pair of pants, shorts, a skirt, tights, etc.), footwear (e.g., shoe, boot, sandals, etc.), facial features, hair style, or the like. At block 702, processing logic identifies graphical assets for each graphical asset category from the list received at block 701 with attribute values that match the attribute values in the character profile.

For example, processing logic may first identify all "garment top" graphical assets that have been tagged with attribute values that match the character profile, and create a list of eligible garment tops to choose from for the simulated character. Processing logic may then identify all "garment bottom" graphical assets tagged with the same attributes, creating a list of eligible garment bottoms to choose from. Processing logic my repeat the process until it has created lists of eligible graphical assets for each graphical asset category. Alternatively, the non-deterministic selection system may create a single list of all eligible assets in all graphical asset categories that match the character profile. At block 703, processing logic determines a list of eligible graphical assets for each graphical asset category using the matching graphical assets identified at block 702. After block 703, the method of FIG. 7 terminates.

Figure 8:
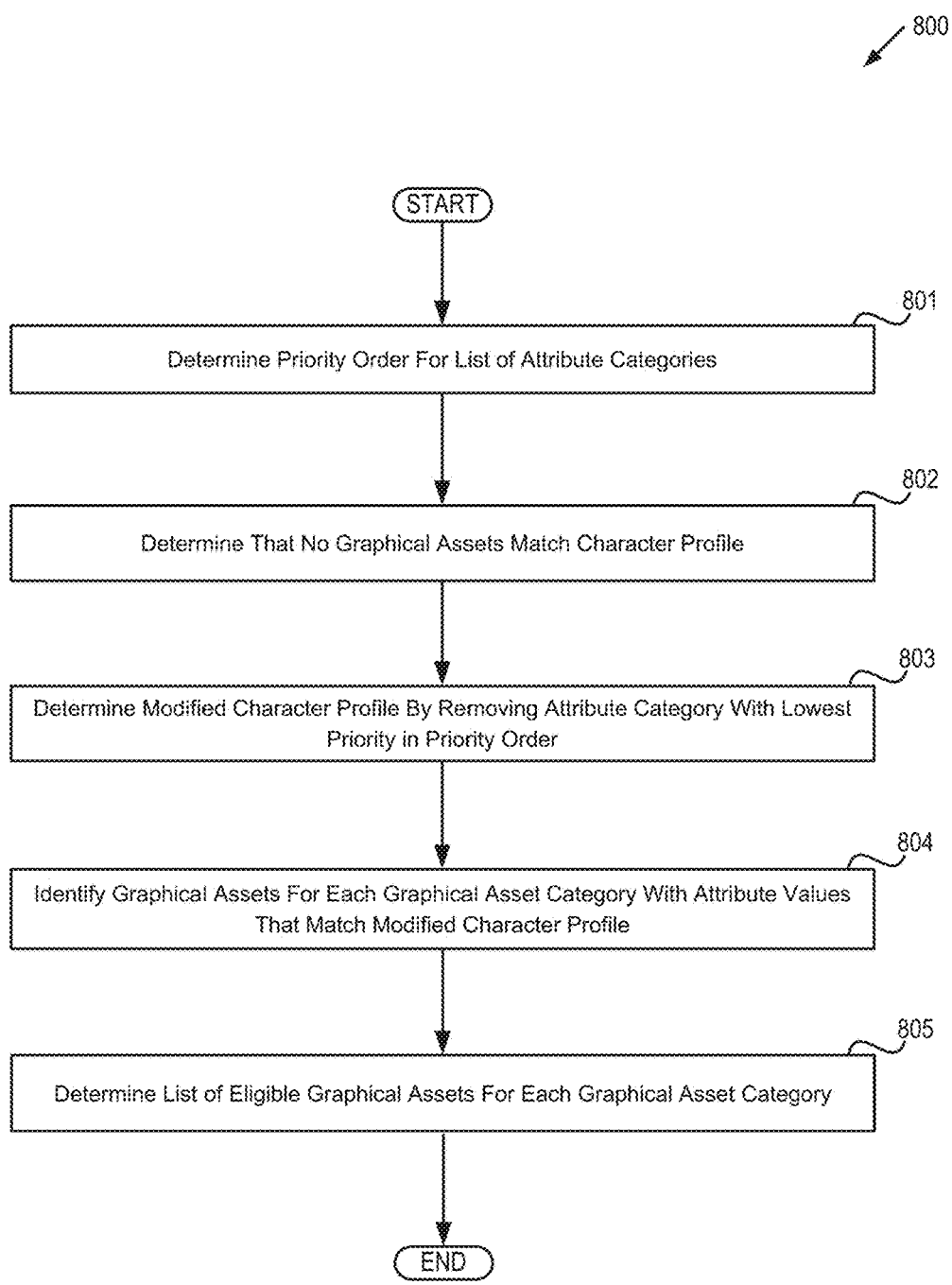
FIG. 8 depicts a flow diagram of a method for identifying a list of graphical assets that match a character profile using prioritization, in accordance with one or more embodiments of the present disclosure.

FIG. 8 depicts a flow diagram of an example method 800 for identifying a list of graphical assets that match a character profile using prioritization. The method may be performed by processing logic that may comprise hardware (circuitry, dedicated logic, etc.), software (such as is run on a general purpose computer system or a dedicated machine), or a combination of both. In one illustrative example, method 800 may be performed by non-deterministic selection module 320 in FIG. 3. Alternatively, some or all of method 800 might be performed by another module or machine. It should be noted that blocks depicted in FIG. 8 could be performed simultaneously (at least partially overlapping in time) or in a different order than that depicted.

At block 801, processing logic determines a priority order for the list of attribute categories. For example, the attribute categories may be Age, Gender, OutfitType, Style, and ColorPalette, where Age is the highest priority category and ColorPalette is the lowest priority category. At block 802, processing logic determines that no graphical assets match the character profile. At block 803, processing logic determines a modified character profile by removing the attribute category with the lowest priority in the priority order determined at block 801. For example, processing logic could remove the ColorPalette category from the character profile to create the modified character profile of Age, Gender, OutfitType, and Style.

At block 804, processing logic identifies the graphical assets for each graphical asset category with attribute values that match the modified character profile. At block 805, processing logic determines a list of eligible graphical assets for each graphical asset category. After block 805, the method of FIG. 8 terminates.

Figure 9:
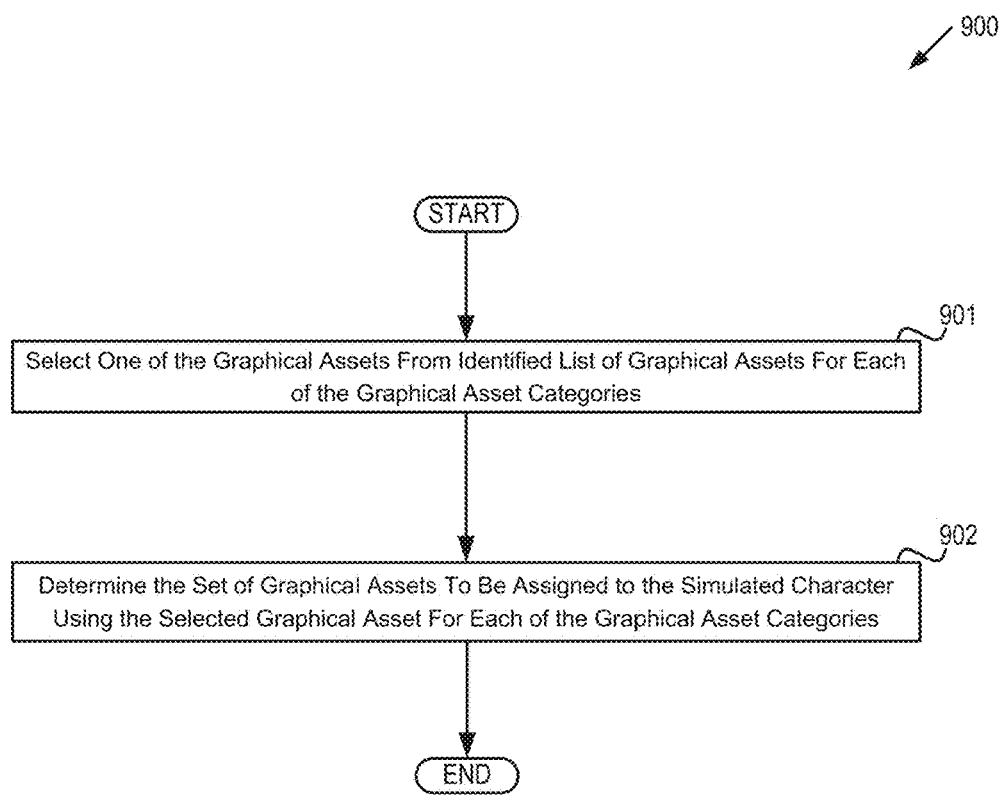
FIG. 9 depicts a flow diagram of a method for selecting graphical assets to be assigned to a simulated character, in accordance with one or more embodiments of the present disclosure.

FIG. 9 depicts a flow diagram of an example method 900 for selecting graphical assets to be used to construct a simulated character. The method may be performed by processing logic that may comprise hardware (circuitry, dedicated logic, etc.), software (such as is run on a general purpose computer system or a dedicated machine), or a combination of both. In one illustrative example, method 900 may be performed by non-deterministic selection module 320 in FIG. 3. Alternatively, some or all of method 900 might be performed by another module or machine. It should be noted that blocks depicted in FIG. 9 could be performed simultaneously (at least partially overlapping in time) or in a different order than that depicted.

At block 901, processing logic selects one of the graphical assets from the identified list of graphical assets for each of the graphical asset categories. In some implementations, each graphical asset may be selected non-deterministically from the associated list of eligible graphical assets. For example, the selected garment top asset may be non-deterministically selected from the list of all eligible garment tops that match the character profile. Similarly, the selected garment bottom may be non-deterministically selected from the list of all eligible garment bottoms that match the character profile. This process can be repeated for each of the graphical asset categories as noted above. At block 902, processing logic determines the set of graphical assets to be used to construct the simulated character using the selected graphical asset for each of the graphical asset categories. After block 902, the method of FIG. 9 terminates.

Figure 10:
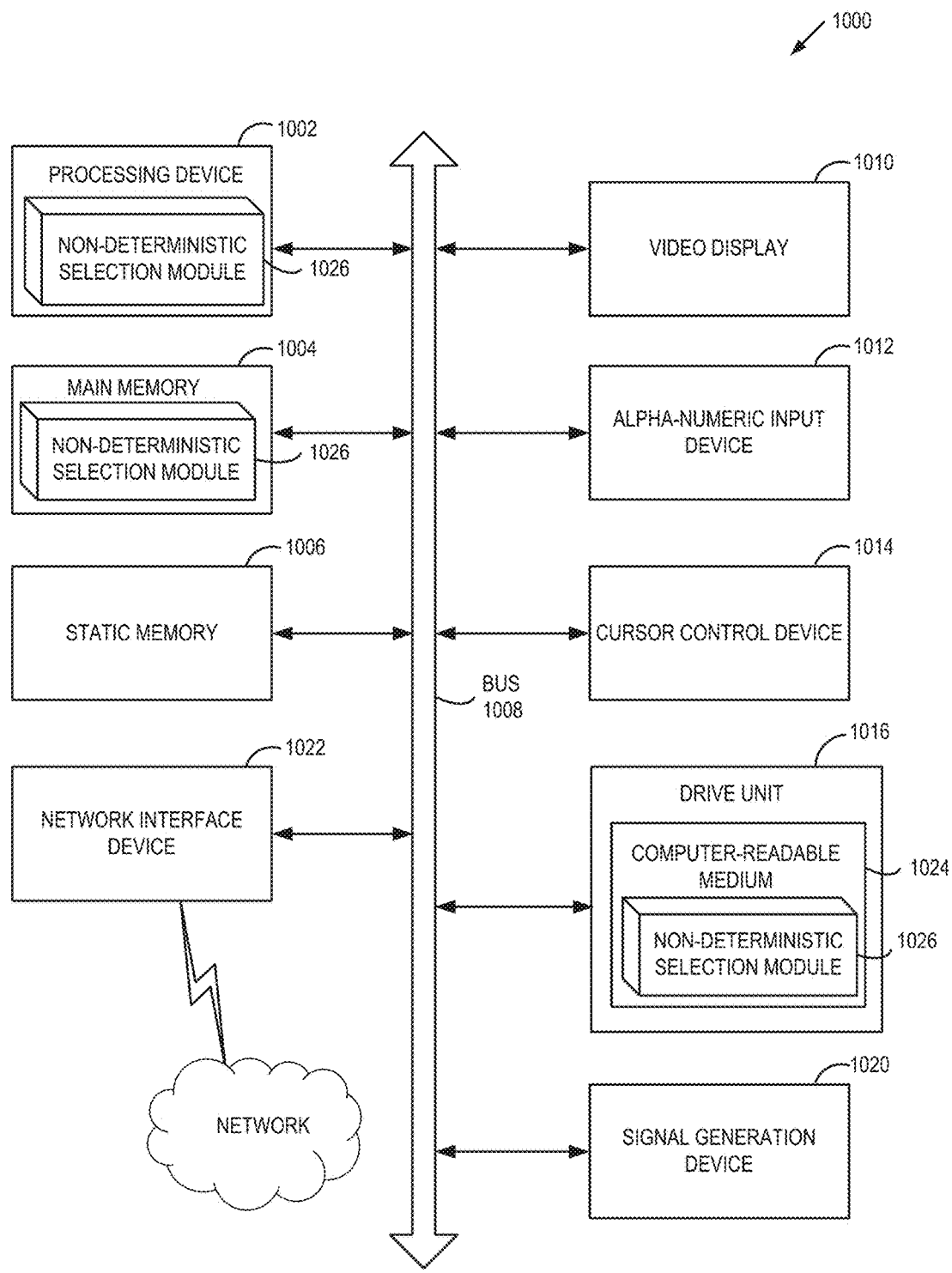
FIG. 10 depicts a block diagram of an illustrative computer system operating in accordance with examples of the invention.

FIG. 10 depicts an example computer system 1000 which can perform any one or more of the methods described herein. In one example, computer system 1000 may correspond to graphical simulation system 300 of FIG. 3. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1000 includes a processing device 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processing device 1002 represents one or more general-purpose processing devices such as a microprocessor, central processing unit (CPU), graphical processing unit (GPU), or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute non-deterministic selection module 1026 for performing the operations and steps discussed herein (e.g., corresponding to the methods of FIGS. 4-9, etc.).

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker). In one illustrative example, the video display unit 1010, the alphanumeric input device 1012, and the cursor control device 1014 may be combined into a single component or device (e.g., an LCD touch screen).

The data storage device 1016 may include a computer-readable medium 1024 on which is stored non-deterministic selection module 1026 (e.g., corresponding to the methods of FIGS. 4-9, etc.) embodying any one or more of the methodologies or functions described herein. Non-deterministic selection module 1026 may also reside, completely or at least partially, within the main memory 1004 and/or within the processing device 1002 during execution thereof by the computer system 1000, the main memory 1004 and the processing device 1002 also constituting computer-readable media. Non-deterministic selection module 1026 may further be transmitted or received over a network via the network interface device 1022.

While the computer-readable storage medium 1024 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled. Particularly, while embodiments of the present disclosure have been described above as applying to polygonal models, these embodiments can also be applied in a similar manner to other three dimensional surface representation structures such as nurbs, splines, subdivision surfaces, etc.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "identifying," "selecting," "constructing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, by a processing device, a list of attributes associated with a plurality of graphical assets, wherein a graphical asset of the plurality of graphical assets comprises a 3D shape employed for graphic rendering of a portion of a simulated character of a simulation video game;
   receiving a first character profile of a first parent simulated character of the simulated character and a second character profile of a second parent simulated character of the simulated character;
   selecting, from the first character profile and the second character profile, an inherited value of an attribute of the list of attributes;
   non-deterministically selecting at least one of: an age attribute of the simulated character or a gender attribute of the simulated character;
   determining, by the processing device, a character profile for the simulated character, wherein the character profile comprises the inherited value of the attribute;
   responsive to failing to identify, among the plurality of graphical assets, a set of graphical assets that matches the character profile, modifying the character profile by removing an attribute associated with a lowest priority in a priority order of attributes; and
   constructing the simulated character using the modified character profile;
   swapping a gender attribute of the simulated character; and
   re-constructing the simulated character using the swapped gender attribute.

2. A non-transitory computer readable storage medium, having instructions stored therein, which when executed by a processing device, cause the processing device to:
   receive a list of attributes associated with a plurality of graphical assets employed for graphic rendering of a portion of a simulated character of a simulation video game;
   receive a first character profile of a first parent simulated character of the simulated character and a second character profile of a second parent simulated character of the simulated character;
   select, from the first character profile and the second character profile, an inherited value of an attribute of the list of attributes;
   non-deterministically select at least one of: an age attribute of the simulated character or a gender attribute of the simulated character;
   determine a character profile for the simulated character, wherein the character profile comprises the inherited value of the attribute;
   responsive to failing to identify, among the plurality of graphical assets, a set of graphical assets that matches the character profile, modify the character profile by removing an attribute associated with a lowest priority in a priority order of attributes; and
   construct the simulated character using the modified character profile;
   swap a gender attribute of the simulated character; and
   re-construct the simulated character using the swapped gender attribute.

3. An apparatus, comprising:
   a memory to store instructions; and
   a processing device, operatively coupled to the memory, to execute the instructions, wherein the processing device is to:
   receive a list of attributes associated with a plurality of graphical assets, wherein a graphical asset of the plurality of graphical assets comprises a 3D shape employed for graphic rendering of a portion of a simulated character of a video game;
   receive a first character profile of a first parent simulated character of the simulated character and a second character profile of a second parent simulated character of the simulated character;
   select, from the first character profile and the second character profile, an inherited value of an attribute of the list of attributes;
   non-deterministically select at least one of: an age attribute of the simulated character or a gender attribute of the simulated character;
   determine a character profile for the simulated character, wherein the character profile comprises the inherited values of the attributes;
   responsive to failing to identify, among the plurality of graphical assets, a set of graphical assets that matches the character profile, modifying the character profile by removing an attribute associated with a lowest priority in a priority order of attributes; and
   construct the simulated character using the modified character profile;
   swap a gender attribute of the simulated character; and
   re-construct the simulated character using the swapped gender attribute.

4. The method of claim 1, wherein the simulated character represents a non-player character which is dynamically generated in course of the simulation video game.

5. The non-transitory computer readable storage medium of claim 2, wherein the simulated character represents a non-player character which is dynamically generated in course of the simulation video game.

6. The method of claim 1, further comprising:
non-deterministically selecting a second inherited value of a second attribute from the first character profile and a third inherited value of a third attribute from the second character profile.

7. The method of claim 1, further comprising:
non-deterministically selecting a first subset of attributes to be inherited from the first character profile; and
identifying remaining attributes of the list of attributes as a second subset of attributes to be inherited from the second character profile.

8. The method of claim 1, wherein the lowest priority is associated with a color palette attribute.

9. The method of claim 1, wherein identifying the set of graphical assets further comprises:
non-deterministically selecting a graphical asset among eligible graphical assets of a specified asset category, wherein the eligible graphical assets match the character profile.

10. The non-transitory computer readable storage medium of claim 2, further comprising executable instructions to cause the processing device to:
non-deterministically select a first subset of attributes to be inherited from the first character profile; and
identify remaining attributes of the list of attributes as a second subset of attributes to be inherited from the second character profile.

11. The apparatus of claim 3, wherein the processing device is further to:
non-deterministically select a first subset of attributes to be inherited from the first character profile; and
identify remaining attributes of the list of attributes as a second subset of attributes to be inherited from the second character profile.

* * * * *